Dec. 5, 1950 — P. M. HIGGS — 2,532,620

LINEAR TIME AXIS PRESSURE RECORDER

Filed Sept. 29, 1949 — 4 Sheets-Sheet 1

INVENTOR.
PAUL M. HIGGS
BY
ATTORNEY

INVENTOR.
PAUL M. HIGGS
BY
ATTORNEY

Dec. 5, 1950 P. M. HIGGS 2,532,620
LINEAR TIME AXIS PRESSURE RECORDER
Filed Sept. 29, 1949 4 Sheets-Sheet 3
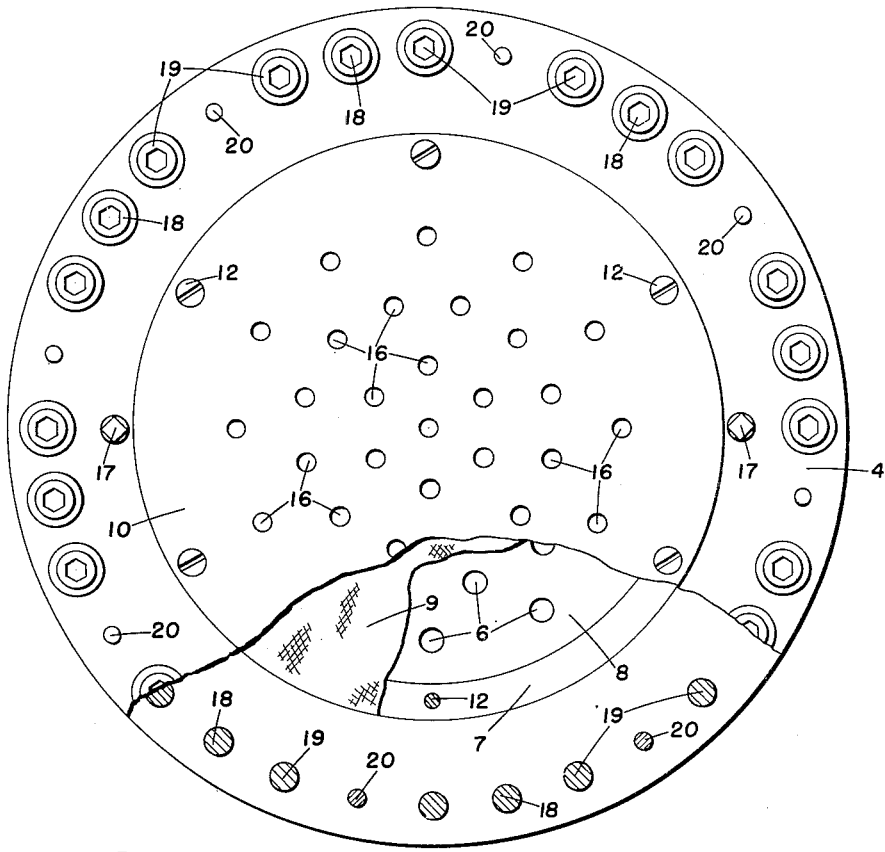
FIG. 4
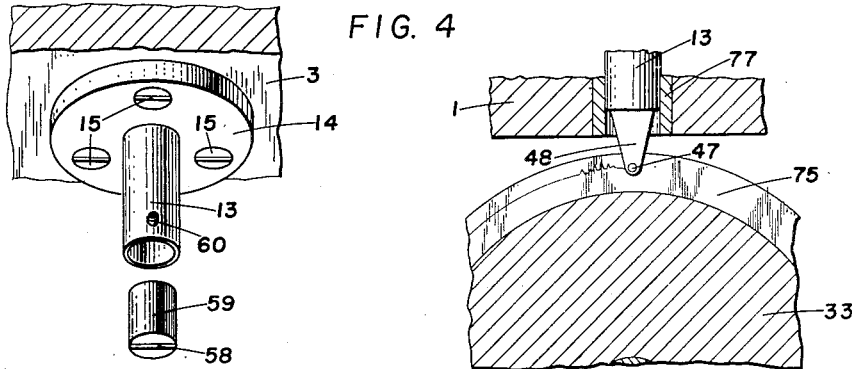
FIG. 5
FIG. 6
INVENTOR.
PAUL M. HIGGS
BY *G. D. O'Brien*
ATTORNEY Dec. 5, 1950 P. M. HIGGS 2,532,620
LINEAR TIME AXIS PRESSURE RECORDER
Filed Sept. 29, 1949 4 Sheets-Sheet 4

INVENTOR.
PAUL M. HIGGS

ATTORNEY

UNITED STATES PATENT OFFICE 2,532,620

LINEAR TIME AXIS PRESSURE RECORDER

Paul M. Higgs, Seattle, Wash., assignor to the United States of America as represented by the Secretary of the Navy Application September 29, 1949, Serial No. 118,648

5 Claims. (Cl. 73—391)

The present invention relates to pressure recorders; more specifically, it relates to a recording pressure gage having means for rotating a record-receiving blank, and a stylus in contact with said blank and movable over the surface thereof in a direction substantially normal to the motion of the blank, whereby said stylus cuts or impresses a record in said blank.

An object of the invention is to provide means for making a record of pressure which has a uniform or linear time base.

More specifically, an object is to provide apparatus comprising a diafragm designed to be subjected to the pressure to be recorded and thus to be deformed thereby, said diafragm coacting with a stylus to move the latter in proportion to said pressure, a motor, and means rotated uniformly by said motor and carrying a record-receiving blank in operative relation with said stylus, whereby a record is made in said blank.

While the underlying principles are applicable to gages of practically any size and pressure rating, the invention is particularly useful in the measurement and recording of relatively high pressures, especially such as are developed and transmitted through water upon the underwater explosion of a mine or torpedo at relatively close range. For such purpose it is also important that a strong water-tight protective casing enclose the recording mechanism of the gage, to permit submergence even at considerable depths, without leakage of water into the said mechanism.

Other objects and many of the attendant advantages of this invention will be appreciated readily as the same becomes understood by reference to the following detailed description, when considered in connection with the accompanying drawings wherein:

Fig. 4 is a plan showing the gage, with various components partly broken away, particularly to illustrate the construction of the gage diafragms and associated elements;

Fig. 5 is an exploded view in perspective, on a very much enlarged scale, of the stylus holder, and a fragment of the diafragm to which the latter is attached;

Fig. 6 is a fragmentary sectional view, on the same scale as Fig. 5, showing the coaction of the stylus and the record blank;

Figure 1:
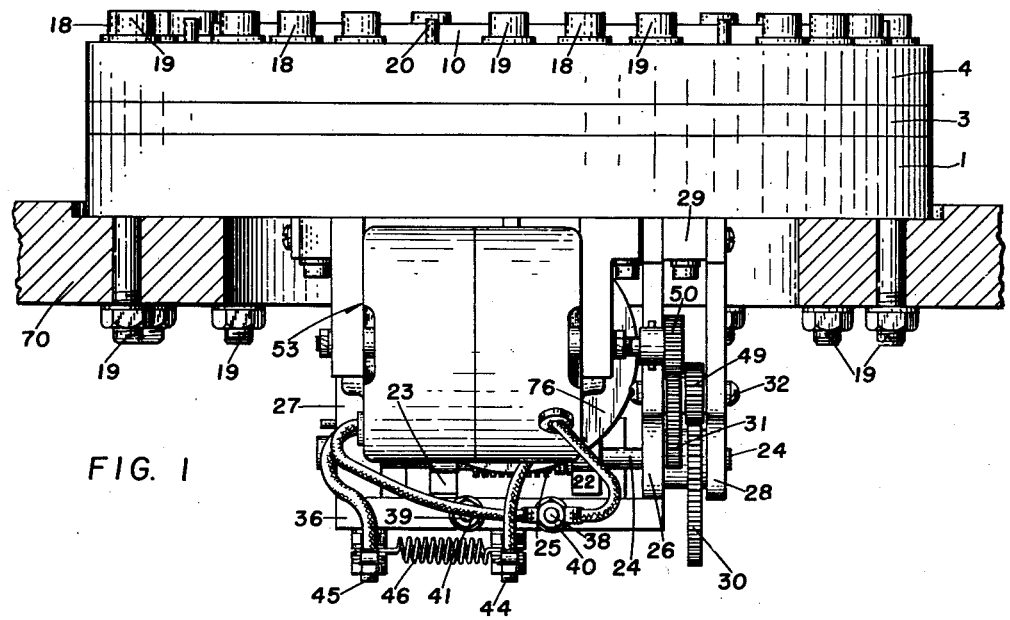
Fig. 1 is a side elevation of a gage embodying the present invention, a portion of a support therefor being indicated in section.
Figure 2:
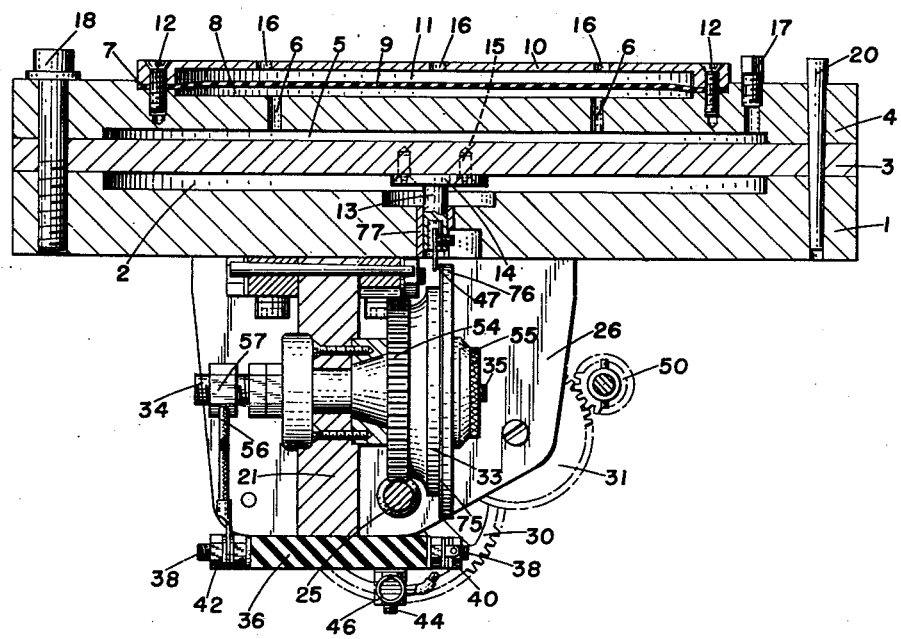
Fig. 2 is a central longitudinal section through the gage, with certain parts in elevation, on planes 2—2 of Fig. 3.

Referring first more particularly to Figs. 1, 2 and 4 of the drawings, the gage comprises a base plate 1 made of relatively thick and rigid material, such as a heavy plate of hard aluminum alloy, the grade known as ST24 being suitable, which serves as a main mounting plate for the assembly. This plate 1 has a shallow recess 2 therein to provide a chamber at the rear of a diafragm 3.

The diafragm 3, which suitably may likewise be made of aluminum alloy, ST24, is the element that is to be deflected by the pressure to be recorded. As the specific gage illustrated is designed for high-pressure use, the diafragm 3 may be one-quarter, five-sixteenths, or three-eighths of an inch thick, or even thicker if desired. The relative responses of these diafragms are shown graphically in Fig. 9; they are substantially linear.

The diafragm 3 is clamped firmly at its periphery between plate 1 and another plate 4, herein called a baffle plate. This plate makes a tight joint with the peripheral portion of the diafragm 3. As no gasket is permissible, this joint is sealed by coating both contacting surfaces with red glyptol. Like the base plate 1, plate 4 is also recessed, as shown at 5, this recess, however, facing oppositely to recess 2, so that the major portion of the diafragm 3 is supported out of contact with either plate.

A chamber is thus formed by the recesses 2 and 5, and the diafragm constitutes a partition that divides said chamber into two parts. A set of openings 6 in the baffle plate 4 affords communication between the front and rear of said plate 4. An idea of the locations of these holes 6 will be obtained from Fig. 4. About thirty holes may be found suitable, to afford well-distributed communication.

The baffle plate 4 has also a shallow annular recess 7 in its front face and a deeper recess 8 within said annular recess, as shown. A barrier diafragm 9, made preferably of neoprene or equivalent readily yieldable material, that is resistant to corrosive influences, has its periphery seated in the recess 7, forming a chamber between its inner surface and the front of the baffle plate 4. It will be noted that the space limited on one side by the front of diafragm 3 and on the other side by the rear of the neoprene diafragm 9 is completely cut off from communication with any other space. This closed space is filled with a suitable damping liquid of high viscosity, for example, Dow Corning No. 200 fluid, a grade having a viscosity of 1000 centistokes being preferred. One very desirable characteristic of this material is a low variation of the coefficient of viscosity with temperature. Suitable openings, closed by threaded plugs 17, may be provided to facilitate introduction of the damping liquid and escape of air. Two such openings, oppositely located and leading to the recess 5, will suffice.

A cover plate 10, having suitable perforations 16, in turn is located in front of the neoprene diafragm. This cover plate 10 has a recess 11 therein, leaving a thick outer annular portion which engages the peripheral portion of the neoprene diafragm. Screws 12 passing through the cover plate 10 and threaded into the baffle plate 4 serve to hold the cover plate and flexible diafragm 9 in place and make a tight joint between the latter and the baffle plate, to retain the viscous liquid.

A tubular stud 13, having a base 14 rigid therewith, is secured to the center of the diafragm 3, as by the screws 15. This stud is guided in a sleeve 77, mounted in the center of base plate 1 and supports the stylus 47, Figs. 2, 5 and 6, which makes the record trace in the surface of the blank. The stylus is thus connected rigidly directly to the diafragm, that is, without the usual interposed motion-multiplying mechanism.

Figure 7:
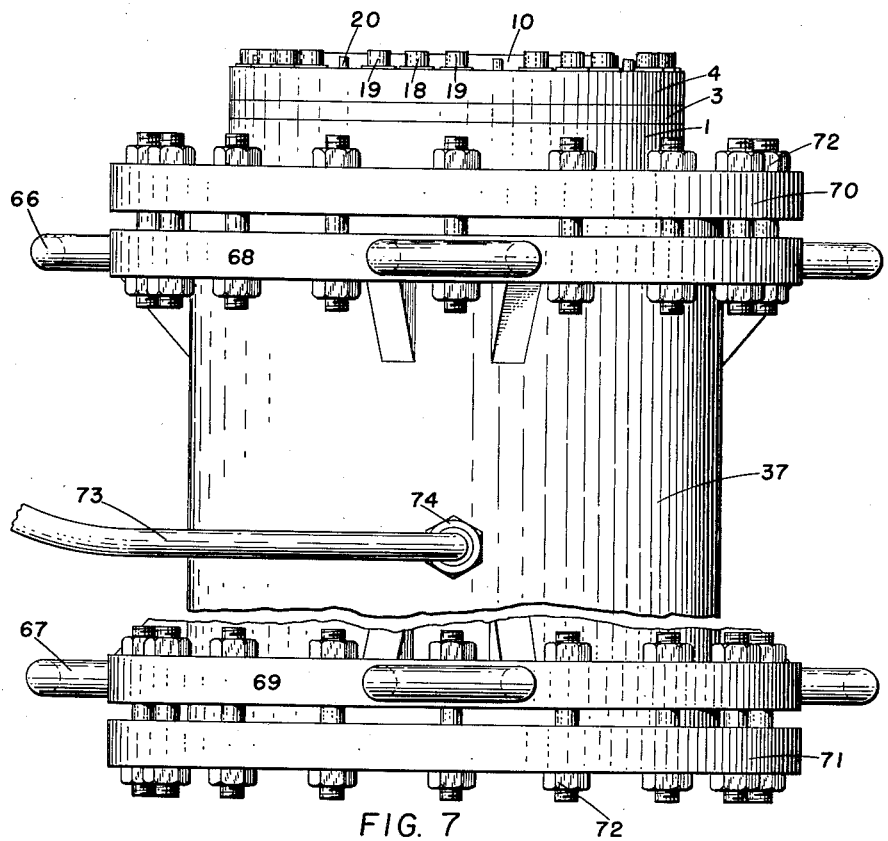
Fig. 7 is a side elevation, on a smaller scale than Figs. 1, 2, and 3, and partly broken away, showing the gage mounted in a protective casing.

The base plate 1, diafragm 3 and baffle plate 4 are secured together firmly by eight bolts 18, which are here shown as having heads of the socket type. An equal number of pins 20 may be provided also, between said bolts, to hold the parts in correct alinement. A set of bolts, such as 19, is also provided, to hold the entire assembly to its support when in use, as shown in Figs. 1 and 7. The joint between base plate 1 and plate 70 must be leak-proof.

Figure 8:
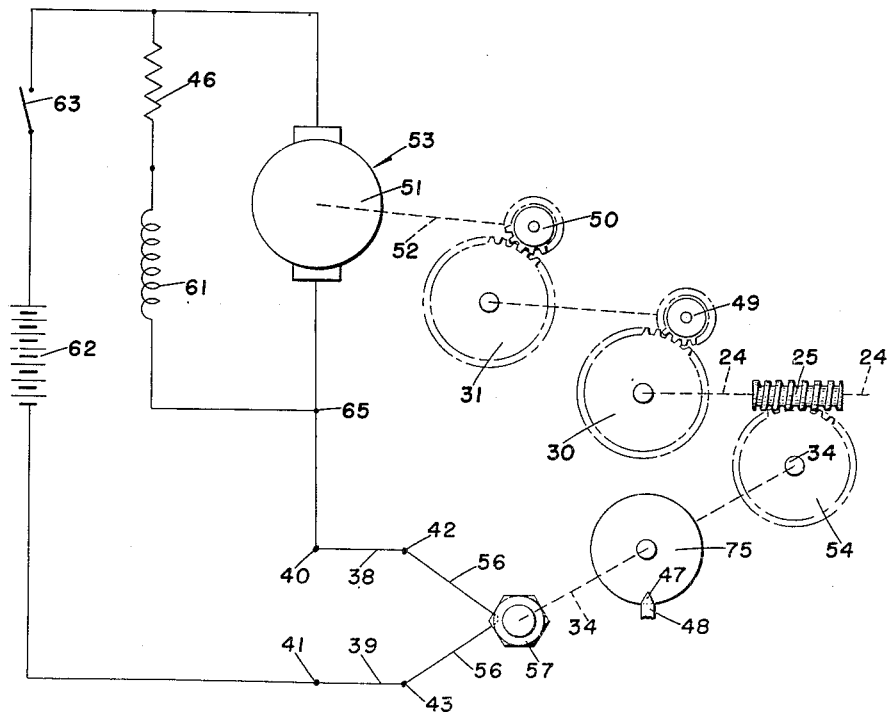
Fig. 8 is a diagrammatic representation of the gearing and the electrical circuits.

Referring to Figs. 1 and 8, details of the motor and gearing carried by base plate 1 are shown. A plate 21, fastened at right angles to the base plate 1, has two lugs 22 and 23 thereon, in which is journaled a shaft 24 carrying a worm 25, which may be integral with or secured to the shaft in any suitable way, as by a pin, key or set screw, for example.

Side plates 26 and 27 are also secured to the base plate 1 and the shaft 24 extends through plate 26 and through a further outside plate 28 spaced therefrom by block 29. Thus the worm shaft 24 is supported firmly, so that it cannot become deranged readily by rough treatment of the recorder.

A spur gear 30 is secured to the shaft 24, between plates 26 and 28, so as to rotate with said shaft, and therefore with the worm 25. The gear meshes with a pinion 49, Figs. 1 and 8, rigidly secured to a second spur gear 31, which is journaled about a stationary shaft in line with the screw 32. Thus the gear 30 will rotate more slowly than gear 31.

A worm wheel 54, Figs. 2 and 8, secured to shaft 34, is in mesh with the worm 25. The shaft 34, which is journaled in plate 21, has its forward end threaded, as shown at 35, so that a knurled or other nut 55 may be threaded thereupon, to secure the record blank and a backing disk for the same, as is disclosed hereinafter. It will be understood that the reduction gearing, which has the ultimate purpose of rotating the record blank at a relatively low speed, is operated by a pinion 50, Figs. 1, 2 and 8, on the shaft of an electric motor 53, said pinion meshing with the gear 31.

Figure 3:
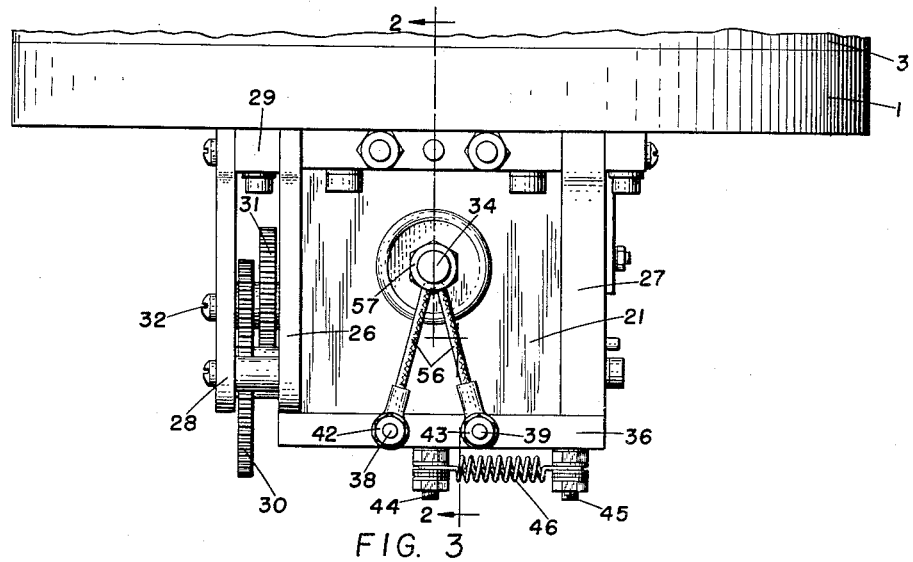
Fig. 3 is an elevation, from the side opposite that shown in Fig. 1, the top of the gage being broken away.

A terminal block 36 of suitable insulating material is mounted on the end plates 26 and 27, and carries electrical terminals which make it convenient to connect the motor to the battery. Rods 38 and 39, which are threaded at each end to receive nuts 40, 41, 42 and 43, pass through the block 36. The nuts 42 and 43 are connected by a conductor 56, Figs. 2, 3 and 8, bent into a V-shape, the apex of the V passing through holes in a nut 57 threaded on the rear end of shaft 34, so that after said shaft has made a certain number of turns, the said nut will be drawn up fully and further rotation will then break the V-shaped conductor. By connecting the motor through rods 38 and 39, it thus becomes possible to stop said motor after its work has been done.

Terminals 44 and 45 serve to make contact with a suitable resistor 46, which thereby is placed in series with the motor field, so that the motor speed may be adjusted by selecting the proper value of the resistor 46. The electrical connections are shown diagrammatically in Fig. 8.

The stylus 47 and record blank 75 shown in Figs. 2, 5 and 6, and associated mechanism, will now be described. This stylus is similar to the "point" of a phonograph needle of the so-called semi-permanent type, and consists of a substantially spherically curved element of extremely hard metallic alloy, said element having a very small radius so that it may be considered as a point.

Said stylus 47 is secured to a flat metal plate 48 which in turn is clamped in a corresponding slot 58 in a chuck 59, received in the bore of stud 13 carried by the diafragm 3, already mentioned. A set screw 60 bears on the chuck 59, to cause it to hold the plate 48 firmly in its adjusted position. It should be noted that the stylus 47 is so oriented by the plate 48 that it extends to the right in Fig. 2, and that the said plate 48 holds the stylus in a plane a trifle to the right of the face of disk 76, so that when a record blank 75 is in place, sufficient pressure will be exerted to cause the stylus to cut a groove in the said blank as the latter turns. The record blank may suitably be a thin steel disk, chromium plated on the trace-receiving face.

Referring now more particularly to Fig. 8, there is shown a motor comprising the armature 51 and the field winding 61. The resistor 46 is seen to be in series with the field winding, when power is derived from a suitable source, shown as the battery 62. The switch 63, which serves to close the circuit to start the motor, may be of any suitable type, and preferably may be activated from outside the casing 37 by suitable electrical signals transmitted through cable 73, Fig. 7.

The record trace is made on the blank 75, Fig. 6, clamped between the disk 33, which is rigidly secured to the shaft 34, and the washer 76, which is stiff enough to hold the relatively thin blank 75 rigidly in a plane. The nut 55, which is threaded on the end of shaft 34, will then serve to hold the entire assemblage in proper position on the shaft to allow the stylus 47 to cut a record trace on the exposed marginal portion of the blank.

In order to enclose the recorder, there is shown a water-tight cylindrical metal casing 37, Fig. 7, having integral upper and lower flanges 68 and 69 respectively. Suitable eyelets 66 and 67 are provided, to receive chains or cables to anchor the apparatus at any desired position and depth when used in the water. Upper and lower end closure plates 70 and 71 are secured to the casing 37, as by bolts 72, suitable gaskets being interposed to ensure water-tightness. This provides a safe enclosure for the operating mechanism of the recorder. Electrical communication with said mechanism is provided by the insulated cable 73, which passes through the wall of the casing 37, a packing gland 74 ensuring a leak-proof seal. This cable 73 may be used to start the recorder mechanism at the proper moment by suitable electrical signals, derived from a radio receiver, or other source. The pressure gage proper is mounted on the upper plate 70, as seen best in Fig. 1. The bolts 19 secure the gage to the said plate 70, as shown.

The operation of the recording gage will presumably be clear from the above description of its structure, but for convenience it is summarized briefly as follows:

The device is placed at the location at which the pressure is to be investigated, on the earth's surface, elevated in the air, or submerged in water at a suitable depth, as the case may be. Any shock wave or pressure wave, within a suitable range of intensity, will produce a corresponding deflection of the gage diafragm 3, and cause the stylus 47 to move radially with respect to the record blank 75.

This blank is firmly clamped against the backing plate 76, so as to resist the pressure of the stylus, which thus can engrave a trace in the prepared chromium plated surface.

Owing to the great thickness of the diafragm 3, its natural period of vibration is high enough to allow the pressure gage to respond to pulses from zero frequency up to 200 cycle per second, and even higher, thus making it admirably suitable for recording pressures of extremely short duration and rapid variability, such as those produced by explosions.

Figure 9:
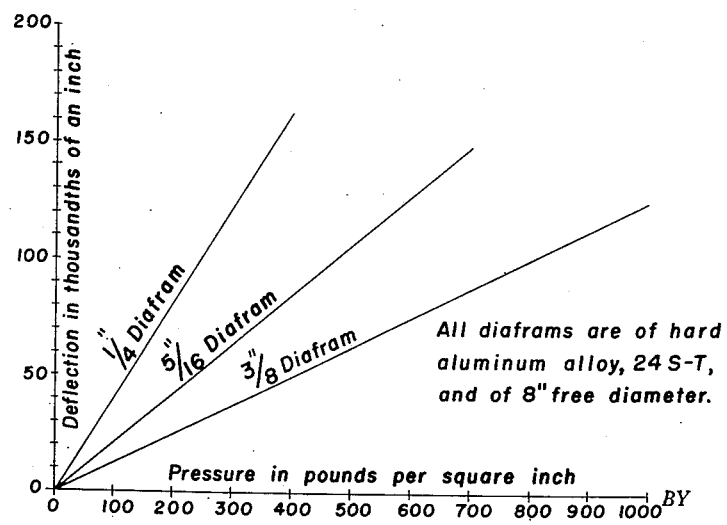
Fig. 9 is a family of curves showing the relation between diafragm deflections and pressures for various thicknesses of diafragm.

Before use, the gage is prestressed hydraulically to the elastic limit of the diafragm, to remove initial strains and uncertainties of response. Thereafter, the response of the gage comes very close to being linear, as is shown by the graphs of Fig. 9, and the pressures recorded may be of high intensity, as likewise indicated in said figure.

The radial motion of the stylus produces a polar-coordinate trace on the record blank, if the latter is in uniform rotation, such rotation being provided by the motor and gearing shown in Figs. 1, 2, 3, and 8.

The motor is started by closing the switch 63. This may be done by an electrical impulse transmitted through the cable 73 or by mechanism activated by the explosion itself. These starting devices are not a part of the present invention, hence are mentioned merely for completeness.

During the time that no pressure pulses are received at the gage, the stylus will merely trace a "zero" line on the record disk, which will then afford a convenient axis of reference. Too many retracings of this axis, however, might be disadvantageous and might partly obliterate the original trace, or by chance add traces due to echoes or stray pulses of pressure, hence it is desirable to open the motor circuit in the manner described briefly hereinbefore, after it can be said with certainty that ample time has been allowed for making the desired record.

Due to the rugged construction of the entire instrument, and the provision of the strong casing, the gage is suitable for use in the immediate vicinity of even a relatively powerful explosion. For example, an instrument weighing about 1200 lbs., withstood successfully the detonation of a 600 lb. charge of TNT in its immediate vicinity, both the explosive and the gage being submerged and thus transmitting the shock wave through a substantially incompressible medium.

The finished record, being a chromium plated steel disk, is relatively resistant even to sea water, hence is not deteriorated rapidly even if the casing should become leaky as the result of an explosion, thus saving the valuable record itself.

Obviously many modifications and variations of the present invention are possible in the light of the above teachings. It is therefore to be understood that within the scope of the appended claims the invention may be practiced otherwise than as specifically described.

What is claimed:

1. A pressure recorder comprising a diafragm, a stylus carried by said diafragm, means securing said diafragm at its peripheral portions, means for delaying the application of the pressure to the diafragm, means for damping the motion of the diafragm in response to pressure, a record-receiving blank, and means for rotating said blank while maintaining it in contact with the stylus, whereby a record of the pressure is made on said blank.

2. A pressure recorder as defined in claim 1, wherein the means for rotating the blank includes an electric motor, and control means for said motor.

3. A pressure recorder as defined in claim 1, wherein the means for rotating the blank includes an electric motor, and speed-reduction means.

4. A pressure responsive device, comprising in combination a base member, said member having a recess in one surface, a relatively stiff pressure-responsive diafragm covering said recess and supported at its periphery by the base member, a baffle plate recessed on both faces and having a portion bearing on the peripheral portion of the other side of the diafragm, said plate having a number of holes therethrough, a substantially non-force-resistant, liquid tight, flexible diafragm on the opposite side of said plate and covering the recess therein, a viscous damping fluid filling the space between the two diafragms, including the holes in the baffle plate, and a perforated recessed plate covering said second diafragm and thus protecting it from mechanical injury.

5. A pressure responsive device as defined in claim 4, wherein the base member has an opening near its center, and the stiff diafragm has a stud projecting therefrom and extending through said opening.

PAUL M. HIGGS.

REFERENCES CITED

The following references are of record in the file of this patent:

UNITED STATES PATENTS

| Number | Name | Date |
| --- | --- | --- |
| 41,182 | Wiegand et al. | Jan. 5, 1864 |
| 1,171,480 | Troll | Feb. 15, 1916 |
| 2,276,580 | Hofer | Mar. 17, 1942 |

OTHER REFERENCES

Holter, Measurement of Ocean Waves, etc., pages 94, 95 and 96, in Electronics, May 1946.